United States Patent [19]

Yanagawa et al.

[11] Patent Number: 5,760,856
[45] Date of Patent: Jun. 2, 1998

[54] IN-PLANE FIELD TYPE LIQUID CRYSTAL DISPLAY DEVICE WITH LIGHT SHIELDING PATTERN SUITABLE FOR HIGH APERTURE RATIO

[75] Inventors: Kazuhiko Yanagawa; Masuyuki Ohta; Kazuhiro Ogawa; Keiichiro Ashizawa, all of Mobara; Katsumi Kondo, Hitachinaka, all of Japan

[73] Assignee: Hitachi, Ltd., Tokyo, Japan

[21] Appl. No.: 698,865

[22] Filed: Aug. 16, 1996

[30] Foreign Application Priority Data

| Sep. 8, 1995 | [JP] | Japan | 7-231090 |
| Sep. 13, 1995 | [JP] | Japan | 7-235004 |

[51] Int. Cl.⁶ .......... G02F 1/136; G02F 1/1335; G02F 1/1333; G02F 1/1343
[52] U.S. Cl. .......... 349/42; 349/106; 349/110; 349/139
[58] Field of Search .......... 349/141, 106, 349/139, 110, 111, 42

[56] References Cited

U.S. PATENT DOCUMENTS 4,568,149  2/1986  Sugata et al. .......... 349/111
5,598,285  1/1997  Kondo et al. .......... 349/42

FOREIGN PATENT DOCUMENTS 0 588 568  3/1994  European Pat. Off.

*Primary Examiner*—William L. Sikes
*Assistant Examiner*—Walter Malinowski
*Attorney, Agent, or Firm*—Antonelli, Terry, Stout, & Kraus, LLP

[57] ABSTRACT

In a liquid crystal display device which is driven by an electric field substantially parallel to the surfaces of substrates, the aperture ratio is high, and the tolerance for alignment of upper and lower substrates is great. The active matrix type liquid crystal display device has a structure in which a counter electrode is provided adjacently to a video signal line, an insulating layer is provided between the video signal line and the counter electrode provided adjacently to the video signal line, the video signal line and the counter electrode are provided with a superimposition portion, and a light shielding layer is disposed within a pixel area in only a direction substantially parallel to a scan signal line. Alternatively, the light shielding layer is formed as a pattern opened and includes a part in the width direction of an area where the counter voltage signal line is formed.

13 Claims, 11 Drawing Sheets

IN-PLANE FIELD TYPE LIQUID CRYSTAL DISPLAY DEVICE WITH LIGHT SHIELDING PATTERN SUITABLE FOR HIGH APERTURE RATIO

BACKGROUND OF THE INVENTION (1) Field of the Invention

The present invention relates to an active matrix type liquid crystal display device and a method for producing the same, and more particularly to a color liquid crystal display device of a so-called in-plane field type with light shielding pattern suitable for high aperture ratio.

(2) Description of the Prior Art

Active matrix type liquid crystal display devices using active elements such as typical thin film transistors (TFT) have been increasingly utilized for displays of OA equipment and the like because they are thin and lightweight and besides provide high quality image equivalent to that of cathode ray tubes. A display system for such a liquid crystal display device, which system is designed to provide display by activating a liquid crystal by means of an electric field substantially parallel to the substrate plane between two electrodes formed on the same substrate and modulating light entering the liquid crystal layer through the gap between two electrodes, has recently been known as a so-called in-plane field type. This in-plane field system, which has a feature of a wide viewing angle, is a promising technology for attaining an active matrix type liquid crystal display device intended for an image display device designed for a plurality of persons to watch the display represented by TV. The features of this system are described in Japanese Patent Application No. 505247/1993 and Japanese Patent Publication No. 21907/1988.

In the case of a liquid crystal display device using the aforementioned liquid crystal display system, a potential irrelevant to a display potential is always and continuously applied between electrodes adjacent to a video signal line and consequently the area therebetween has to be shielded from light by means of a light shielding layer. If the boundary of the light shielding layer is provided in the display area, light shielding is ensured but the aperture ratio is lowered. If the boundary of the light shielding layer is provided over and within the electrodes adjacent to the video signal line, the aperture ratio is prevented from lowering. However, a high accuracy is required to position the light shielding layer in this case and there arises a problem that the productivity is reduced.

The aforesaid liquid crystal display device is so configured that a pixel area is surrounded with a scan signal line and a counter voltage signal line which extend in the direction of row (x) and video signal lines which extend in the direction of column (y) and are adjacent to each other. The above relationship is true for a group of pixel areas including pixel areas arranged in the direction of row (x).

For that reason, there has been a restriction that the counter voltage signal line common to the group of pixel areas has to be disposed close to the scan signal line common to another adjoining group of pixel areas, and a fixed distance has to be secured to prevent their short-circuiting.

Therefore, the area of the display area is inevitably restricted and so-called aperture ratio has reached a limit.

In particularly the in-plane field system, the need to generate an electric field of a predetermined value in the liquid crystal layer leads to the alternate arrangement of a plurality of common electrodes and counter electrodes within the pixel area and this has made intolerable the problem of the limit to the improvement of the aperture ratio.

An object of the present invention made in view of the foregoing situation is to provide a liquid crystal display device improved in the aperture ratio and the productivity.

SUMMARY OF THE INVENTION

In order to solve the problems above, an active matrix type liquid crystal display device is so configured as to have the following features:

(Means 1) An active matrix type liquid crystal display device comprising two substrates arranged opposite to each other via a liquid crystal layer, at least one substrate being transparent, in which a pixel electrode, a counter electrode, a counter voltage signal line, a scan signal line, a video signal line and an active element are provided in each pixel area on the one substrate side, and an electric field having a component substantially parallel to the at least one transparent substrate is generated in the liquid crystal layer by the voltage applied between the pixel electrode and the counter electrode, whereby the light transmitted through the liquid crystal layer is modulated, wherein the counter electrode is formed in substantially parallel and adjacently to the video signal line via an insulating layer with respect to the video signal line, the video signal line and the counter electrode have a two-dimensionally superimposition portion via the insulating layer, and a light shielding layer is formed in a direction substantially parallel to the scan signal line.

(Means 2) An active matrix type liquid crystal display device according to the means 1, wherein two counter electrodes branching off from the counter voltage signal line with a space therebetween are formed in substantially parallel and adjacently to respective video signal line via the insulating layer, the video signal line and each of the two counter electrodes have the two-dimensionally superimposition portion via the insulating layer, and the light shielding layer is formed in a direction substantially parallel to the scan signal line.

(Means 3) A liquid crystal display device comprising two substrates arranged opposite to each other via a liquid crystal layer, at least one substrate being transparent, in which a pixel electrode, a counter electrode, a counter voltage signal line, a scan signal line, a video signal line and an active element are provided in each pixel area on the one substrate side, and an electric field having a component substantially parallel to the at least one transparent substrate is generated by the voltage applied between the pixel electrode and the counter electrode in the liquid crystal layer, whereby the light transmitted through the liquid crystal layer is modulated, wherein a light shielding film is in the form of a pattern which is opened and includes a part in the width direction of an area where the counter voltage signal line is formed for each pixel area.

Alternatively, the counter voltage signal line is commonly used for one group of pixel areas constituted of the parallel pixel areas provided in the direction of row (x), also commonly used for another group of pixel areas adjacent to the one group of pixel areas in the direction of y, and disposed between both groups of pixel areas, and wherein the light shielding layer is in the form of a pattern which is opened and includes an area where the counter voltage signal line is formed for each of the pixel areas which shares the counter voltage signal line and is adjacent to each other in the direction of column (y).

(Means 4) The light shielding layer is made substantially linear within the pixel area.

(Means 5) The light shielding layer is formed by a printing method.

(Means 6) The light shielding layer and a layer colored with the three primary colors are manufactured by a printing method.

(Means 7) A polarizing plate and the rubbing direction are set to a normally black display mode.

The functions of the present invention will subsequently be described.

(Function 1) In the case of a liquid crystal display device using the so-called in-plane field system, a potential irrelevant to the potential between a pixel electrode and a counter electrode is always applied between the electrodes adjacent to a video signal line and consequently the area therebetween has to be shielded from light by means of a light shielding layer. When the area between the electrodes adjacent to the video signal line is shield from light by means of the independent light shielding layer superimposed over the video signal line within a pixel area, it is necessary to provide the boundary of the light shielding layer in the display area in such a manner that the boundary thereof protrudes from the counter electrode into the display area when the tolerance for alignment of upper and lower substrates is taken into consideration. Thus the aperture ratio has been reduced by such a protrusion. Therefore, according to the present invention, the counter electrode is provided adjacent to the video signal line and the video signal line as well as the counter electrode is provided with the superimposed portion so as to make the counter electrode have the effect of the light shielding layer; that is, the area between the video signal line and the counter electrode is shielded from light. In this case, the independent light shielding layer superimposed over the video signal line in the pixel area becomes unnecessary. Since the boundary portion having the light shielding function is thus determined as the boundary of the counter electrode, the aperture ratio is improved. It is needless to say that the video signal line and the counter electrode need to be formed of opaque conductive material. Further, the light shielding layer should be superimposed over the scan signal line two-dimensionally and disposed in only a direction along the scan signal line. With respect to the tolerance for alignment of the upper and lower substrates, in the direction parallel to the scan signal line, the boundary line of the layer colored with three primary colors of a color filter only needs to exist in any region between the counter electrodes on both sides of the video signal line, whereby the tolerance therefor can be made greater. In a direction perpendicular to the scan signal line, moreover, the long side of the rectangular pixel area is aligned and consequently the influence of the misalignment on the aperture ratio is far less than that on the short side thereof, whereby the tolerance for alignment of the upper and lower substrates can also be made greater.

A so-called vertical field type liquid crystal display device can be configured like the in-plane field type according to the present invention by providing, on the same substrate that contains the video signal line, a metal layer having the superimposed portion with respect to the video signal line. However, the provision of the two-dimensionally superimposed portion between the pixel electrode which is a transparent electrode and the metal layer is indispensable and this results in increasing the value of the load capacitance coupled to the pixel electrode. Therefore, the video information stored in the pixel electrode tends to fluctuate and the problem is that variation in luminance considerably increases, thus deteriorating the image quality. However, in the so-called in-plane field type liquid crystal display device, such a problem can be ignored. In other words, the constitution of the present invention can achieve a magnificent effect for the so-called in-plane field type liquid crystal display device.

(Function 2) When the counter electrode is so formed that the whole surface under the video signal line is covered therewith, the capacitance between the counter electrode and the video signal line increases. This means the capacitance component connected to the counter voltage signal line increases and so does horizontal smear. Consequently, the two counter electrodes branching off from the counter voltage signal line with a space therebetween are formed under the video signal line, whereby the capacitance component can be reduced since the area of the combination of the video signal line and the counter electrode that have been superimposed can be reduced. Thus the horizontal smear level can be lowered.

(Function 3) Further, the domain generating region on the periphery of the counter voltage signal line is largely limited to the periphery of the intersection of the pixel electrode and the counter voltage signal line. Therefore, it is unnecessary to form the light shielding layer in the portion corresponding to the counter voltage signal line, and the light shielding layer can be formed as a pattern opened for each pixel area. This means the light shielding having a great tolerance at least in the direction of at least column (y) is formable, and the light shielding film having a large opening area is formable.

(Function 4) The light shielding layer is formed linearly within the pixel area, so that the structure of the light shielding layer is simplified. This means the light shielding layer is formable without using the photoresist process and the degree of freedom of selecting the processes of manufacture can be enhanced.

(Function 5) If the light shielding layer is formed in only a direction parallel to the scan signal line within the pixel area, the light shielding layer pattern is simplified and the application of the printing method to the formation of the light shielding layer is facilitated. Particularly, when the light shielding layer is formed linearly, the pattern is extremely simple so that the light shielding layer is simply formable through a manufacturing process using the printing method. Thus improvement in productivity and reduction in production cost are achievable.

(Function 6) Further, an exposure system can be dispensed with by using the printing method to form the layer colored with the three primary colors. Thus the investment in equipment becomes reducible.

(Function 7) The adoption of the normally black display mode makes the display less affected by the domain generating region and the area where orientation is disordered. Thus improvement in display contrast, and particularly in the black level, is made possible.

The foregoing and other objects, advantages, manner of operation and novel features of the present invention will be understood from the following detailed description when read in connection with the accompanying drawings.

DESCRIPTION OF THE PREFERRED EMBODIMENT

[Embodiment 1]

A panel having the following structure was employed as a liquid crystal display panel in this embodiment.

Two transparent glass substrates 101, 201 used were 1.1 mm thick and had polished surfaces.

Figure 1A:
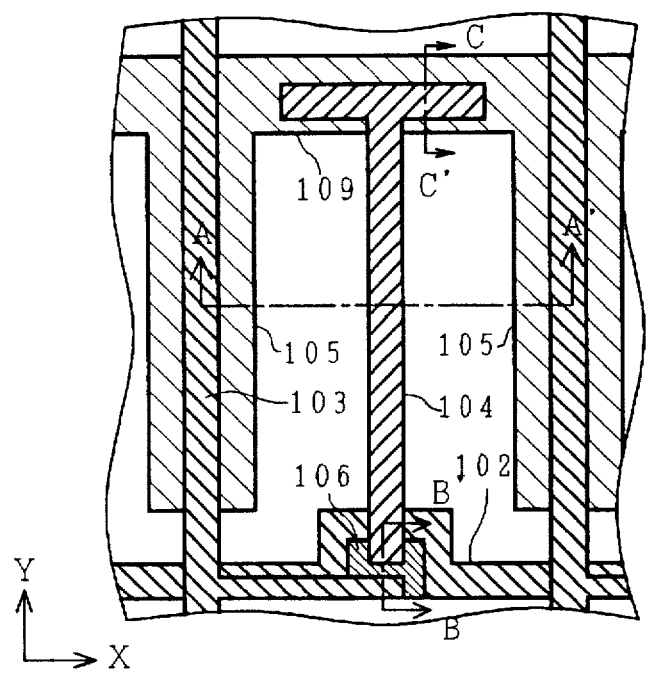
FIG. 1A is a structural plan view of a pixel on the transparent substrate 101 side in Embodiment 1.
Figure 1B:
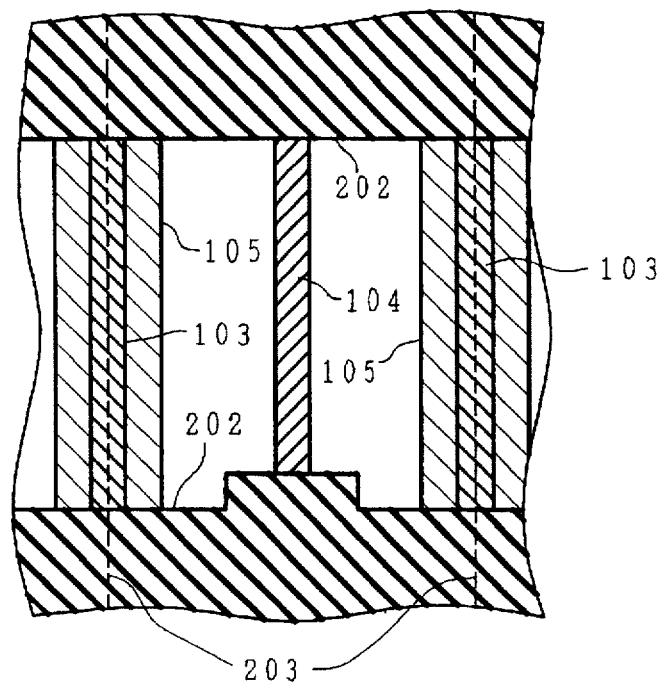
FIG. 1B is a plan view showing the relation of relative position between a light shielding layer 202 on the transparent substrate 201 side and a pixel on the transparent substrate 101 side in Embodiment 1.
Figure 2:
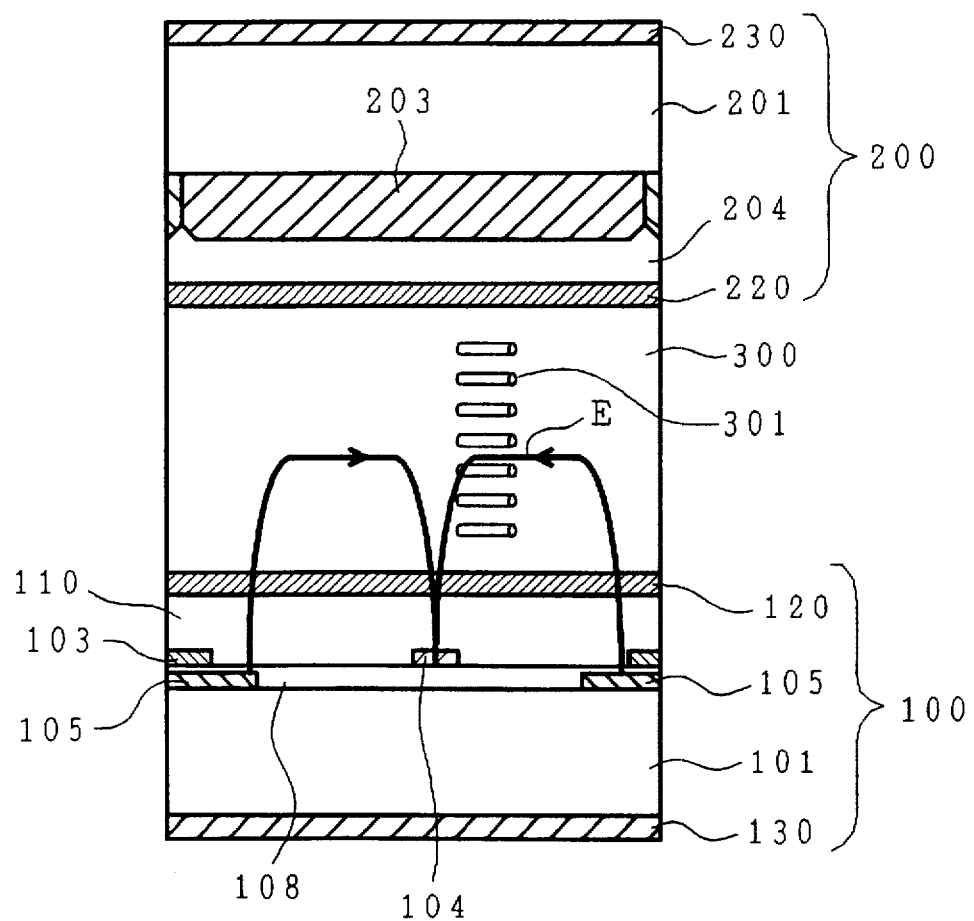
FIG. 2 is a structural sectional view taken on line A–A' of FIG. 1A.

A thin film transistor was formed on one substrate 101 of these substrates. FIG. 1A is a structural plan view of a pixel on the transparent substrate 101, wherein reference numeral 102 denotes a scan (gate) signal line; 103, a video (drain) signal line; 104, a pixel electrode; 105, a counter electrode; and 109, a counter voltage signal line. FIG. 1B is a plan view showing the relation of relative position between a light shielding layer 202 on the transparent substrate 201 side and a pixel on the transparent substrate 101 side. The light shielding layer was provided in only the direction along the scan signal line. The light shielding in a direction perpendicular to the scan signal line was achieved by superimposing the video signal line and the adjoining counter electrode via an insulating film. The counter electrode adjacent to the video signal line was integrally formed in the pixels adjacent to each other in the direction of row. FIG. 2 is a structural sectional view taken on line A–A' of FIG. 1A. The electric fields E between the pixel electrodes 104 and the counter electrodes 105 which were formed on the transparent substrate 101 were used for controlling the orientation of liquid crystal molecules 301 in a liquid crystal layer 300 so as to modulate the brightness of light entering from between the pixel electrodes 104 and the counter electrodes 105 and to emit the light thus modulated. Moreover, the light shielding layer, a layer colored with three primary colors and the like were arranged on the other substrate 201. A transparent resin 204 for flattening the surface was stacked on the layer 203 colored with three primary colors.

Orientation films 120, 220 were each formed on the uppermost surfaces of the two substrates and a liquid crystal composition 300 was sealed in between the substrates after a rubbing process and held in between two polarizing plates 130, 230 to form a liquid crystal panel.

Figure 3:
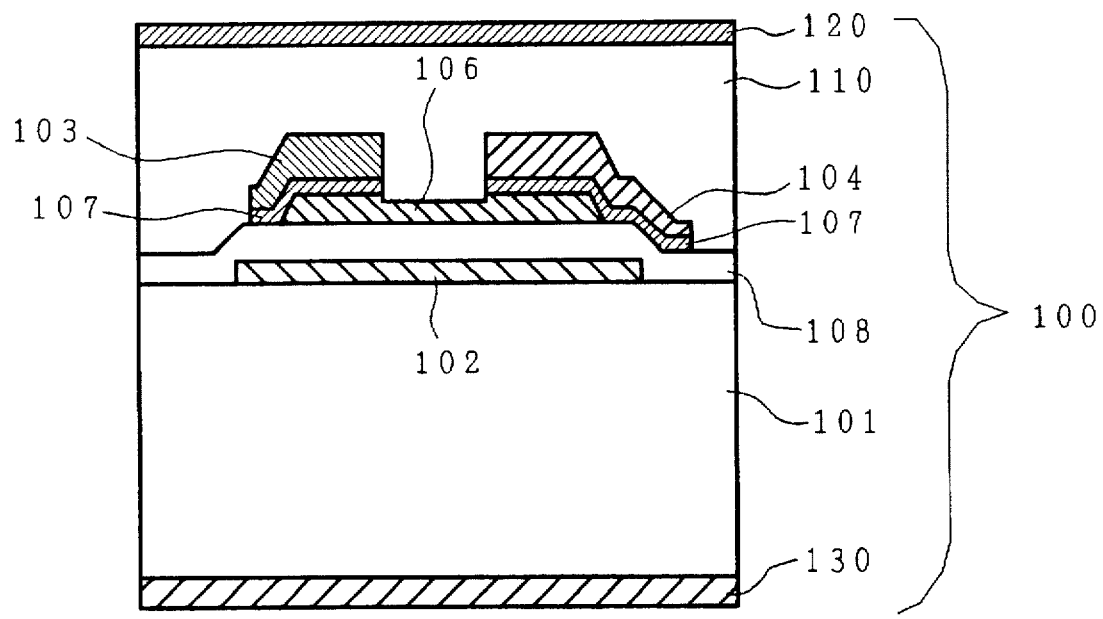
FIG. 3 is a structural sectional view taken on line B–B' of FIG. 1A.
Figure 4:
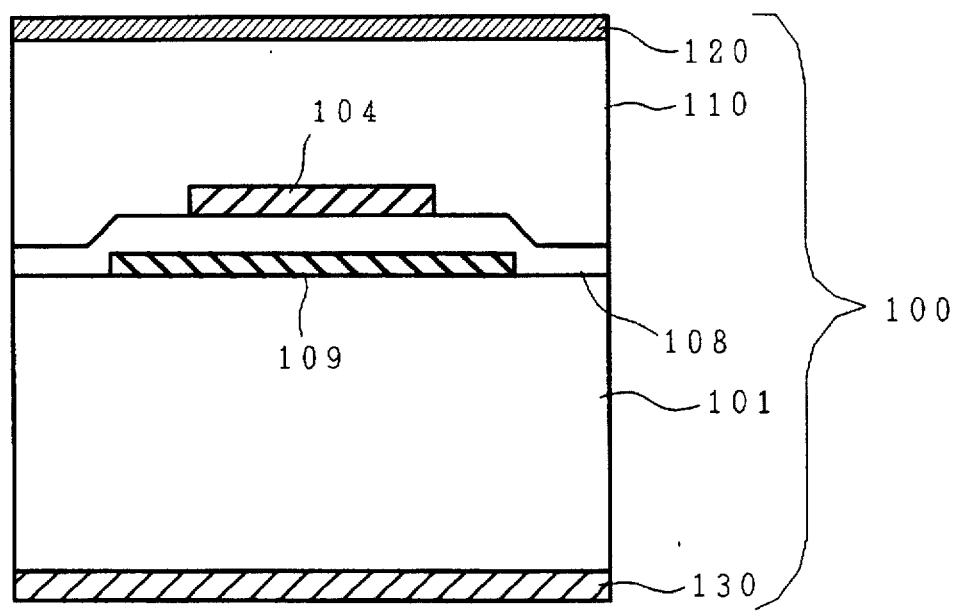
FIG. 4 is a structural sectional view taken on line C–C' of FIG. 1A.
Figure 8:
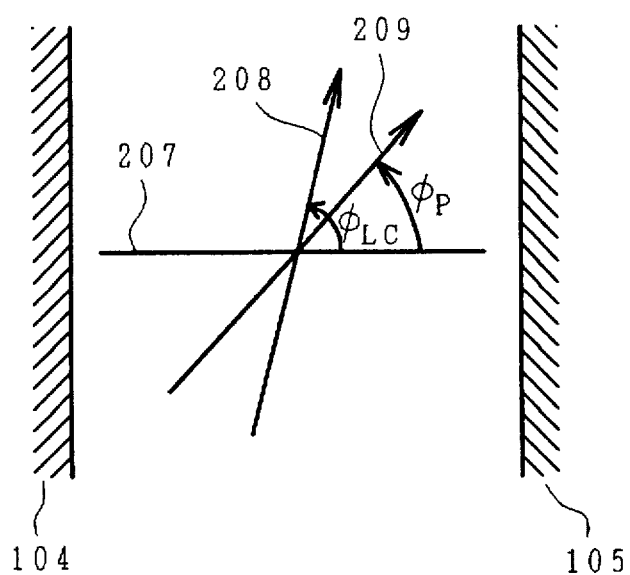
FIG. 8 is a view illustrating an angle of an orientation direction of major axes of molecules (rubbing direction) φLC on an interface with respect to an electric field direction, and an angle of a transmission axis φP of one polarizing plate.

FIG. 8 shows the relation among the direction of the electric field 207, the rubbing direction 208 and the polarization transmission axis 209. A polyimide film was adopted as an orientation film according in this embodiment. The rubbing directions on the upper and lower interfaces were substantially parallel to each other and the angle φLC to the direction of the applied electric field 207 was at 85°. As the liquid crystal composition 300, use was made of a nematic liquid crystal composition whose anisotropy of dielectric Constance Δε was positive and took a value of 7.3 (measured at 1 KHz) and whose anisotropy of refraction index Δn was 0.073 (measured at 589 nm, 20° C.). The gap between the substrates was ensured by dispersing spherical polymer beads therebetween and the distance was about 4.1 μm in such a state that the liquid crystal was sealed therein. Polarizing plates G1220DU of Nitto Denko Co. were used; the polarization transmission axis of one polarizing plate was set at an angle substantially similar to the rubbing direction, namely, φP=85°, and the other at an angle perpendicular thereto. FIG. 3 is a structural sectional view taken on line B–B' of FIG. 1A, of a thin film transistor element. The thin film transistor element comprised the pixel electrode 104 (source electrode), the video signal line 103 (drain electrode), the scan signal line 102 (gate electrode) and amorphous silicon 106. The thin film transistor element 150 had an inverted stagger structure in which the scan signal line 102 was formed in the lowermost layer, then a gate insulating film 108 and the amorphous silicon 106 were successively formed thereon, and the video signal line 103 and the pixel electrode 104 were formed of the same metal layer. Further, n+ type amorphous silicon 107 doped with phosphorus was formed between the amorphous silicon 106 and the video signal line 103 and between the amorphous silicon 106 and the pixel electrode 104 in order to establish ohmic contact therebetween. FIG. 4 is a sectional view taken on line C–C' of Fig. 1A, of a storage capacitor Cstg. The pixel electrode 104 and the counter voltage signal line 109 sandwiched the gate insulating film 108. A projected portion extending from the counter voltage signal line 109 was used as the counter electrode 105.

Figure 7:
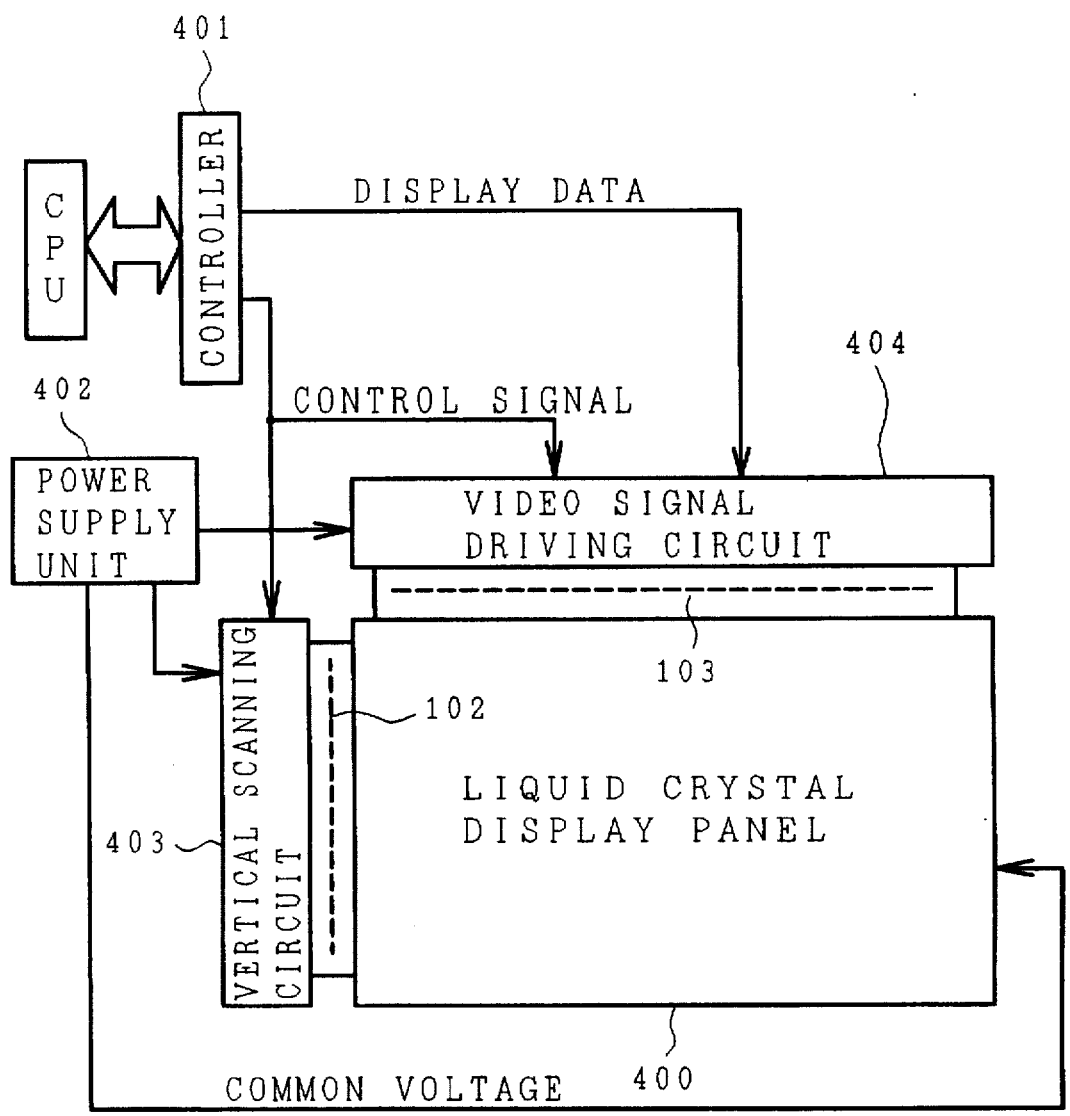
FIG. 7 is a view illustrating a peripheral circuit of a liquid crystal display device.

FIG. 7 illustrates a peripheral circuit of this embodiment. A liquid crystal display panel 400 is provided with a vertical scanning circuit 403 and a video signal driving circuit 404 as external circuits. The vertical scanning circuit 403 is used to feed a scan signal (voltage) to each of the scan signal lines 102, and the video signal driving circuit 404 feeds a video signal (voltage) to each of the video signal lines 103 synchronously with the video signal.

The vertical scanning circuit 403 and the video signal driving circuit 404 are fed with a voltage from a power supply unit 402 and also fed by a controller 401 with image information from a CPU which is separated into display data and a control signal.

Moreover, the voltage applied to each of the counter voltage signal lines 109 is also supplied from the power supply unit 402. Incidentally, in this embodiment, the voltage applied to each of the counter voltage signal lines 109 is an alternate voltage in order to decrease the breakdown voltage of the video signal driving circuit 404.

This embodiment is a liquid crystal display device having a high aperture ratio since the counter electrode superimposed on the plane of the video signal line takes the role of light shielding. It is possible in this embodiment, to greatly increase the tolerance for alignment of upper and lower substrates by providing the light shielding layer in only the direction along the scan signal line.

Moreover, the counter electrode thus superimposed is able to suppress noise causing vertical smear from intruding into a display area from the video signal line more effectively.

[Embodiment 2]

Figure 5:
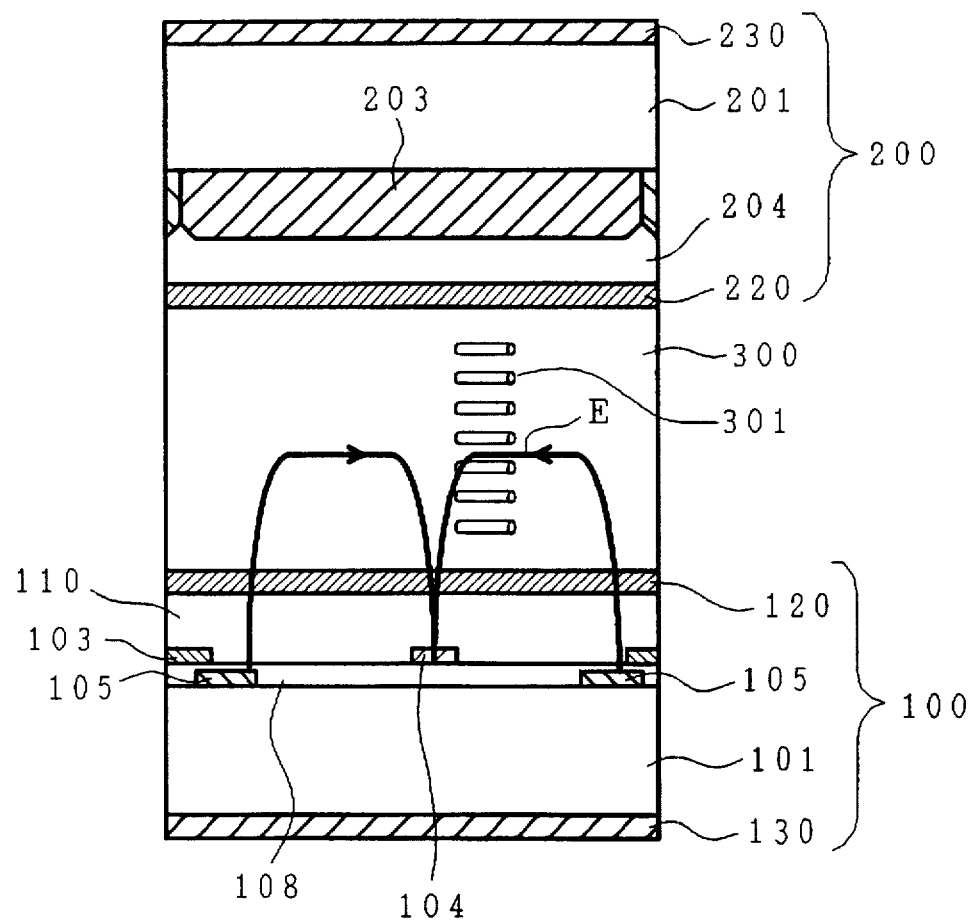
FIG. 5 is a structural sectional view of a pixel portion in Embodiment 2.

Embodiment 2 differs from Embodiment 1 in that the counter electrode 105 is differently configured. FIG. 5 illustrates a structural section of a pixel portion of this embodiment.

When the counter electrode 105 is formed in such a manner as to cover the whole surface under the video signal line 103, the capacitance produced between the counter electrode and the video signal line increases; this means that the capacitance component coupled to the counter voltage signal line increases, thus causing horizontal smear to increase. In this embodiment, the capacitance component is made reducible by arranging two counter electrodes which branch off from the counter voltage signal line with a space therebetween under the video signal line. Thus this arrangement has the effect of reducing the horizontal smear further in comparison with Embodiment 1.

[Embodiment 3]

Figure 6:
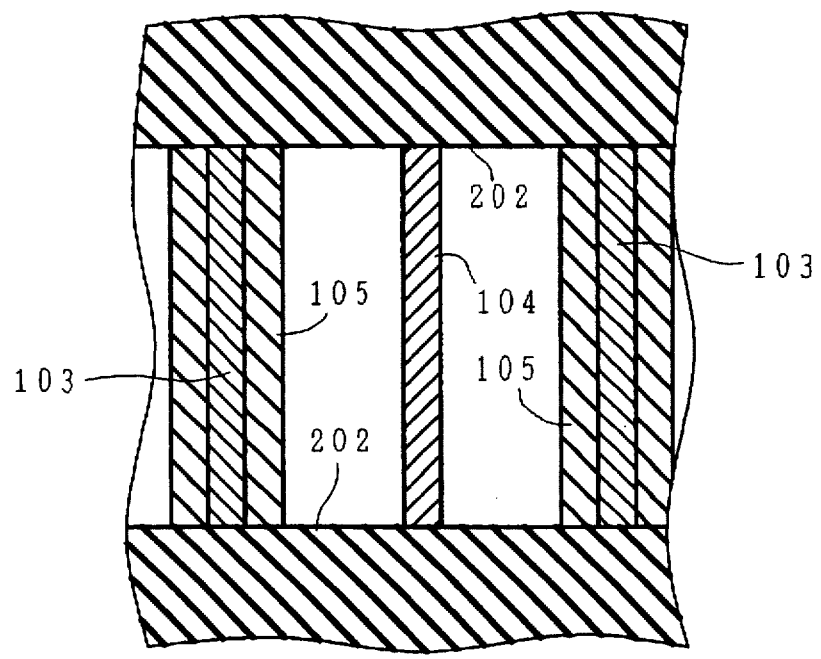
FIG. 6 is a view illustrating a light shielding layer in Embodiment 3.

Embodiment 3 differs from Embodiment 1 in that the light shielding layer is differently configured. FIG. 6 illustrates the planar placement of a light shielding layer in the pixel portion of this embodiment. The light shielding layer was substantially linearly formed in a pixel area. Thus the structure of the light shielding layer is simplified. This means that no photoresist process is needed to form the light shielding layer and consequently the degree of freedom of selecting the desired manufacturing process can be heightened.

[Embodiment 4]

Unlike Embodiment 3, a printing method was employed for forming the light shielding layer in Embodiment 4. The features of printing method of color filter are described in Japanese Patent Publication No. 29750/1990 and Japanese Patent Publication No. 3123/1986.

In this embodiment, the light shielding layer was formed by forming a metal film made of chrome on the surface of the transparent substrate 201, printing a light shielding layer pattern with a resist, removing the unnecessary metal film by etching and then removing the resist. The photoresist process became unnecessary, thereby reducing the cost and improving the productivity.

Even though the light shielding pattern is formed in the direction along the scan signal line, the electric field distribution in the display area hardly falls into disorder. Therefore, the driving voltage rise hardly raises a problem. Although metal was used as material for the light shielding layer in this embodiment, any material may be used as long as it has light shielding properties. Whether the material is organic or inorganic, it may be included in the category of this embodiment.

[Embodiment 5]

The printing method was employed for forming the light shielding layer in Embodiment 5 as in Embodiment 4. In this embodiment, however, a material mainly containing organic substances was used to form the light shielding layer directly through the printing method. Thus linear patterns of the light shielding layer became formable through only the printing step out of the steps of Embodiment 4 in this embodiment, which resulted in further reducing the cost and improving the productivity as compared with Embodiment 4.

[Embodiment 6]

In Embodiment 6, the layers 203 colored with three primary colors were also formed through the printing method after the light shielding layer was formed using the technique employed in Embodiment 5. Therefore, the investment in the equipment becomes reducible because an exposure unit can be dispensed with in the process of manufacturing light shielding layers and layers colored with three primary colors.

[Embodiment 7]

Figure 9:
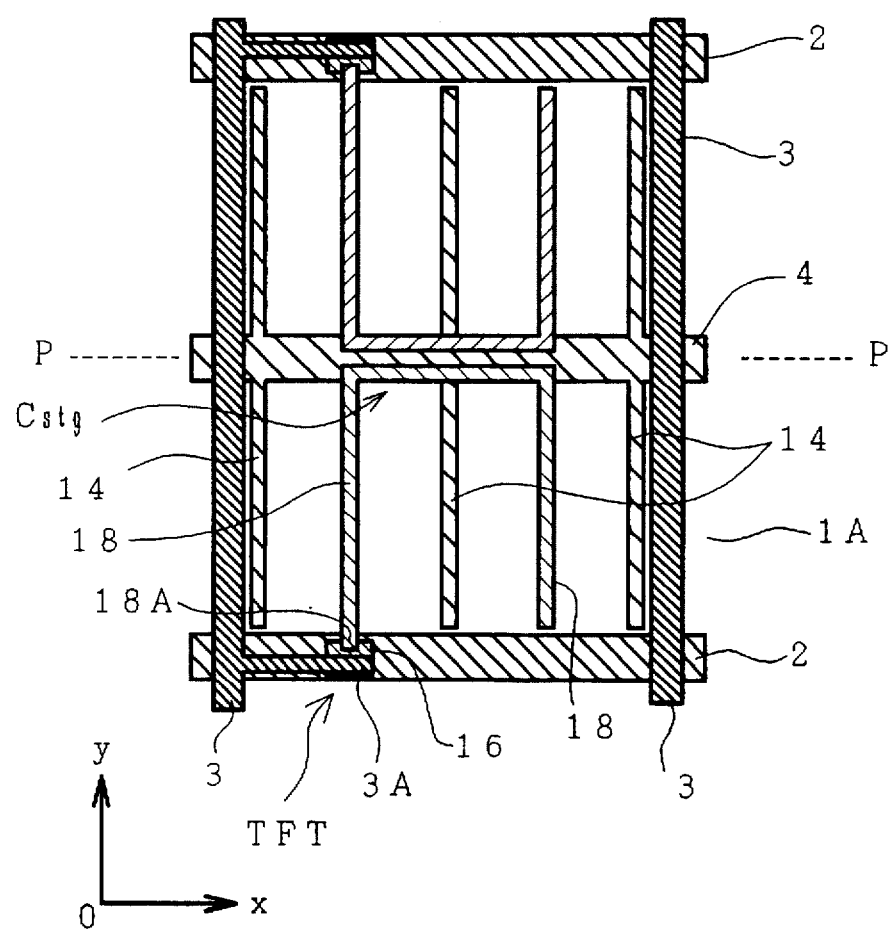
FIG. 9 is a structural plan view of a pixel on the transparent substrate 1A side in Embodiment 7.

FIG. 9 is a plan view showing the structure of a pixel in detail of this embodiment. In FIG. 9, there are shown two pixel regions arranged in the direction of column (y) with a counter voltage signal line 4 therebetween. Moreover, these pixel regions are symmetrical, in other words, they are superposed one on another when folded along the counter voltage signal line 4, i.e., the P—P line of FIG. 9.

In reference to FIG. 9, scan signal lines 2 extending in the direction of row (x) are formed in parallel on the main surface of a transparent substrate 1A. One of the adjoining scan signal lines 2, positioned on the (+)y direction side, is responsible for the pixel positioned on the (−)y direction side, whereas the other scan signal line 2 positioned on the (−)y direction side is responsible for the pixel positioned on the (+)y direction side.

With this arrangement, the counter voltage signal line is commonly used by adjoining groups of pixel regions provided parallel in the direction of row (x).

Since the number of counter voltage signal lines set parallel in the direction of column (y) is roughly halved compared to conventional arrangements, so that the area of the display region can be increased.

In the central area between the scan signal lines 2 lies the counter voltage signal line 4 extended in the direction of row (x).

In this case, between the portion of pixel electrode 18 superimposed on the counter voltage signal line 4 and the counter voltage signal line 4, a storage capacitor Cstg using the insulating film 108 as a dielectric film is formed. The storage capacitor Cstg has the effect of allowing video information to be stored in the pixel electrode 18 for a long time when the thin film transistor TFT is turned off.

Further, a silicon nitride film, for example, as a protective film 110 (see FIGS. 3, 4, 5), is formed on the thin film transistor TFT and the orientation film 120 is formed on the protective film 110 so as to constitute the so-called lower substrate of the liquid crystal display device. Further, the polarizing plate 130 is disposed on the face opposite to the liquid crystal layer side of the lower substrate.

Figure 10:
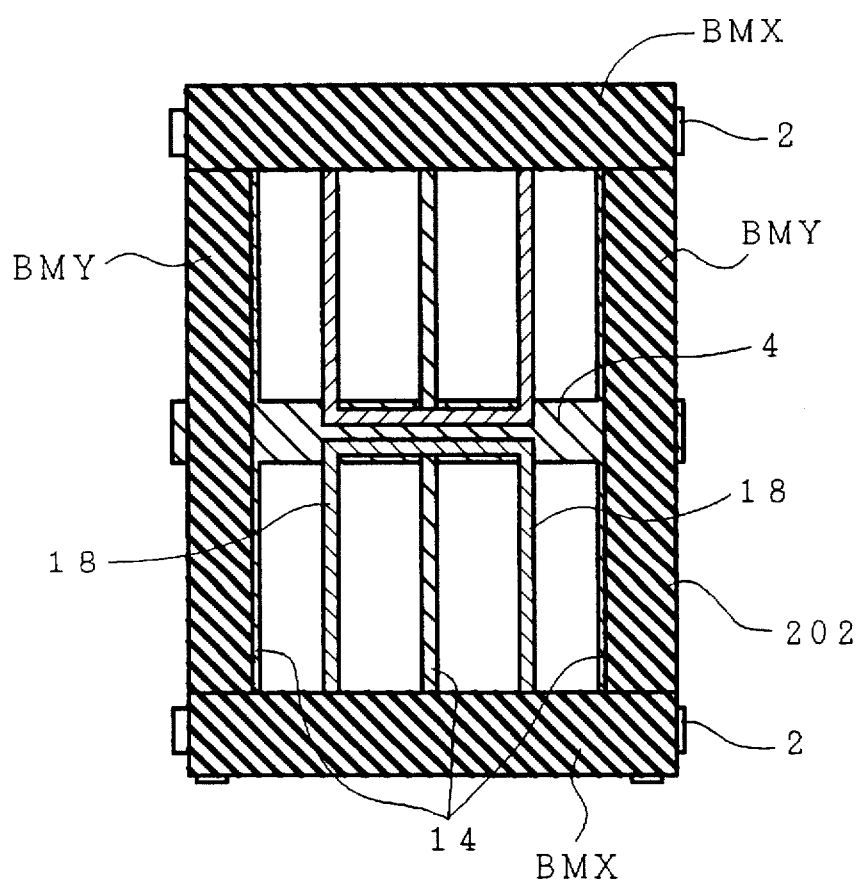
FIG. 10 is a plan view of an example of the light shielding pattern in Embodiment 7 in relation to FIG. 9.

Then a light shielding film 202 having openings in portions corresponding to respective display areas is formed on the liquid crystal side of a transparent substrate 1B which is used as a so-called upper substrate. In the case of Embodiment 7, the light shielding film 202 is not formed within the partial area where the counter voltage signal line 4 is formed. More specifically, as is obvious from FIG. 10 showing the positional relation of the light shielding film 202 to the arrangement shown in FIG. 9, the light shielding film 202 is formed as a pattern surrounding the two pixel regions, with the counter voltage signal line 4 therebetween.

As described in Embodiment 2, the light shielding in a direction perpendicular to the scan signal line may be effected in such a manner that a video signal line 3 and a counter electrode 14 adjacent thereto are superimposed via the insulating film 108 without forming a light shielding pattern portion BMY. In other words, the light shielding film 202 can be, as shown in FIG. 10, composed of only the substantially linear pattern BMX.

By the provision of the light shielding film 202 particularly in the form of such a pattern as stated above, the light shielding film 202 having a great tolerance at least in the direction of column (y) is formable when the facing transparent substrates 1A, 1B are arranged via the liquid crystal layer, and the light shielding film 202 having a large opening area is also formable.

The light shielding film 202 has a function to prevent the thin film transistor TFT from being directly irradiated with light and a function to improve the display contrast.

Further, a color filter 203 covering the opening of the pixel region is formed. The color filter 203, taking vertical stripes as an example, has different colors between the pixel regions adjacent in the direction row (x). In other words, the color filter 203 has different colors on both lateral sides on the video signal line 3.

Further, a flat film 204 formed of a resin film or the like is formed on the surface on which the color filter 203 is formed and the orientation film 220 is formed on the surface of the flat film 204. Further, the polarizing plate 230 is disposed on the face opposite to the liquid crystal layer side of the upper substrate.

The relation among the direction of the electric field 207, the rubbing direction 208 and the polarization transmission axis 209.is the same as that in Embodiment 1.

A domain generating region on the periphery of the counter voltage signal line 4 in each pixel area which is adjacent in the direction of column (y) and has the counter voltage signal line 4 is chiefly limited to the periphery of the intersection of the pixel electrode and the counter voltage signal line. In other words, the domain is generated in the vicinity of the area where the storage capacitor Cstg is formed and limited to the inside of the area of the planar pattern of the counter voltage signal line. For this reason, the light shielding layer 202 on the other transparent substrate side disposed via the liquid crystal layer does not need to be formed in the portion corresponding to the counter voltage signal line 4. This means the light shielding film 202 having a great tolerance at least in the direction of column (y) is formable when the facing transparent substrates are arranged via the liquid crystal layer, and the light shielding film 202 having a large opening area is also formable.

[Embodiment 8]

Figure 11:
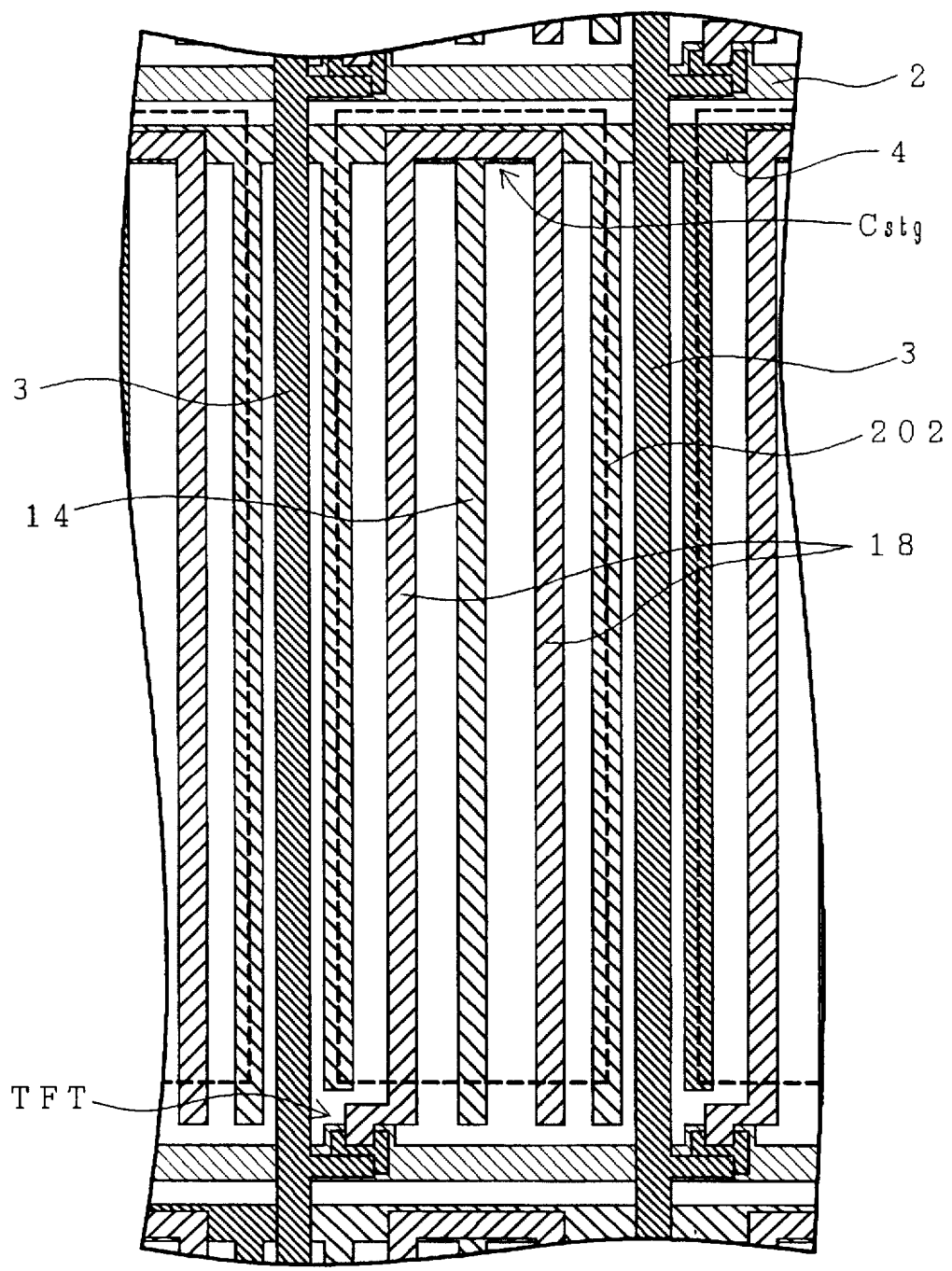
FIG. 11 is a structural plan view of a pixel on the transparent substrate 1A side in Embodiment 8.

FIG. 11 shows an embodiment in which the aperture ratio is improved by reforming the light shielding film pattern in an arrangement in which the counter voltage signal line 4 is not put to common use unlike Embodiment 7.

The light shielding film 202 formed on the transparent substrate 1B side is such that its opening is made to correspond to the portion enclosed with a dotted line. In other words, though the light shielding film 202 is so formed that it fully covers the video signal line 3 and the scan signal line 2. it is formed as a pattern having an opening including part of the counter voltage signal line 4 in its width direction.

The reason for not covering at least a part of the counter voltage signal line 4 with the light shielding film 202 is similar to the case of Embodiment 7, whereby the light shielding film 202 having a large opening area is formable.

[Embodiment 9]

Figure 12:
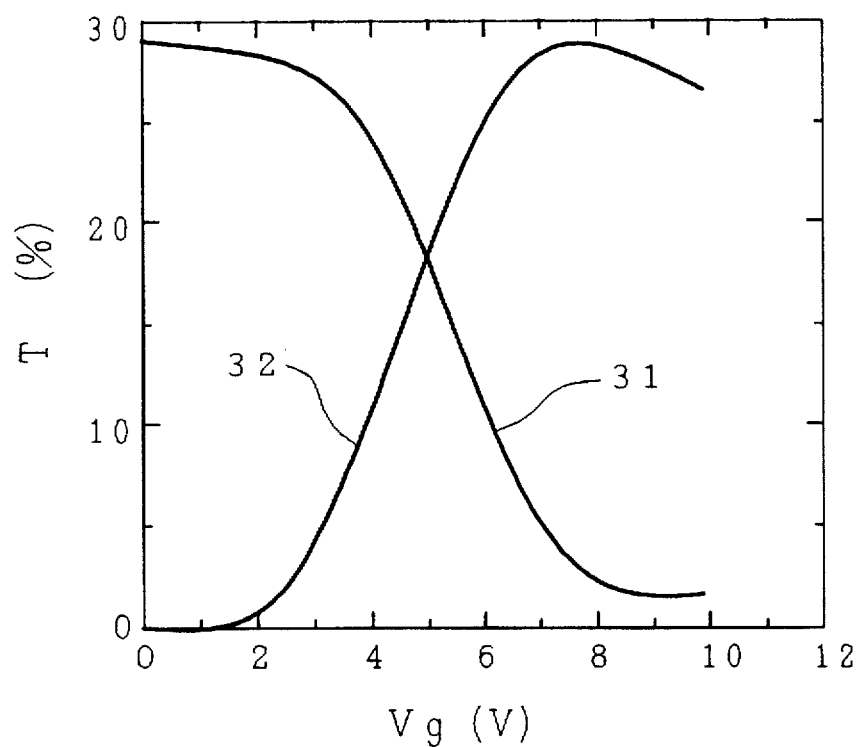
FIG. 12 is a graph showing exemplary characteristics of a normally white and a normally black mode applicable to the liquid crystal display device according to the present invention.

While the scan signal line 2, the counter voltage signal line 4, the counter electrode 14, the pixel electrode 18 and the like in the pixel area are left intact, a so-called normally black mode is adopted in Embodiment 9 in which the light transmitted from one transparent substrate side via liquid crystal layer to the other transparent substrate intercepted when no electric field is applied between the pixel electrode and the counter electrode. The characteristic curve 32 of FIG. 12 shows the transmission versus applied voltage (T-V) characteristic in the normally black mode.

In order to attain the normally black mode, the rubbing directions of the orientation films 120, 220 formed on the liquid crystal sides of the transparent substrates 1A, 1B are parallel to each other, and the polarizing films 130, 230 each formed on the liquid crystal side and on the opposite side of each of the transparent substrates 1A, 1B are so formed that the transmission axis of one of them is parallel to the rubbing direction, and the transmission axis of the other is perpendicular thereto; that is, this arrangement is similar to that of Embodiment 1.

The arrangement like this has the effect of preventing the black level in display and the contrast ratio from deteriorating because of the domain on the periphery of the intersection of the pixel electrode 18 and the counter voltage signal line 4.

More specifically, in the case of a normally white mode in which light transmitting from one transparent substrate side via the liquid crystal layer to the other transparent substrate side is intercepted when the electric field is applied to the pixel electrode 18 and the counter electrode 14, it does not follow that the whole electric field becomes parallel to the transparent substrate when the electric field is applied but there exists a tilted portion particularly in the area in the vicinity of the superimposed portion of the counter voltage signal line 4 and the pixel electrode 18, whereby the black level is deteriorated since the liquid crystal driving condition is not uniform.

In FIG. 12, the characteristic curve 31 shows the T-V characteristic in the normally white mode.

When the normally black mode is adopted as in this embodiment, the components of the electric field generated between the pixel electrode 18 and the counter electrode 14 when the voltage is applied include the tilted component as described above, so that it is possible to improve the practical aperture ratio so as to transmit a certain amount of light.

It is to be understood easily that the normally black mode is applicable to liquid crystal display devices having structures described in reference to the embodiments above.

Although the light shielding film 202 is formed on the opposite substrate side in each embodiment, the invention is, needless to say, also applicable to an arrangement in which the light shielding film 202 is formed on the substrate side on which a thin film transistor is formed.

Further, though the video signal line is formed above the counter electrode via the insulating layer in each embodiment, the present invention is, needless to say, also applicable to an arrangement in which the counter electrode is formed above the video signal line via the insulating layer.

As will be obvious from the description above, the liquid crystal display device according to the present invention allows the so-called aperture ratio to be improved. Moreover, the tolerance for aligning the upper and lower substrates increases, so that the productivity can be improved.

What is claimed is:

1. An active matrix type liquid crystal display device comprising two substrates arranged oppositely to each other via a liquid crystal layer, at least one substrate being transparent, in which a pixel electrode, a counter electrode, a counter voltage signal line, a scan signal line, a video signal line and an active element are provided in each pixel area on the one substrate side, and an electric field having a component substantially parallel to said at least one transparent substrate is generated by the voltage applied between the pixel electrode and the counter electrode in the liquid crystal layer, whereby the light transmitted through said liquid crystal layer is modulated, wherein the counter electrode is formed in substantially parallel and adjacently to said video signal line via an insulating layer with respect to said video signal line, said video signal line and said counter electrode are disposed in superimposed relation over at least a major portion of said video signal line.

2. An active matrix type liquid crystal display device as claimed in claim 1, wherein two counter electrodes branching off from said counter voltage signal line with a space therebetween are formed in substantially parallel and adjacently to respective video signal lines via the insulating layer with respect to said video signal lines, said video signal line and each of said two counter electrodes are disposed in superimposed relation over at least a major portion of said video signal line.

3. An active matrix type liquid crystal display device as claimed in claim 1, wherein said counter electrode extends substantially in a same direction as an extension direction of said video signal line, said superimposed relation of said counter electrode and said video signal line serving as a light shield.

4. An active matrix type liquid crystal display device as claimed in claim 1, wherein a light shielding layer is formed in only a direction substantially parallel to a direction of extension of said scan signal line.

5. A liquid crystal display device comprising two substrates arranged opposite to each other via a liquid crystal layer, at least one substrate being transparent, in which a pixel electrode, a counter electrode, a counter voltage signal line, a scan signal line, a video signal line and an active element are provided in each pixel area on the one substrate side, and an electric field having a component substantially parallel to said at least one transparent substrate is generated by the voltage applied between the pixel electrode and the counter electrode in the liquid crystal layer, whereby the light transmitted through said liquid crystal layer is modulated, wherein plural pixel areas are arranged in a matrix extending in a row direction and a column direction, said counter voltage signal line is commonly used for one group of pixel areas constituted of parallel pixel areas provided in the row direction, also commonly used for another group of pixel areas adjacent to the one group of pixel areas in the column direction, and disposed between both the one and the another group of pixel areas.

6. A liquid crystal display device as claimed in claim 5, wherein a light shielding film is in the form of a pattern which is opened and includes an area where said counter voltage signal line is formed for each of the pixel areas which shares said counter voltage signal line and is adjacent to each other in the column direction.

7. A liquid crystal display device as claimed in claim 5, wherein said counter voltage signal line commonly used for both the one group and the another group of pixel areas is a single counter voltage signal line extending substantially in parallel to and between two scan signal lines.

8. An active matrix type liquid crystal display device as claimed in either claim 1 or claim 5, wherein a light shielding layer is provided substantially parallel to the scan signal line and linear within the pixel area.

9. A liquid crystal display device as claimed in either claim 1 or claim 5, wherein the light transmitted from the at least one transparent substrate side via liquid crystal to another transparent substrate side is intercepted when the electric field is not applied between the pixel electrode and the counter electrode.

10. A liquid crystal display device as claimed in either claim 1 or claim 5, wherein the rubbing directions of orientation films formed on the liquid crystal sides of respective transparent substrates are substantially parallel to each other, and the transmission axis of one of the polarizing plates each formed on the opposite side to the liquid crystal side of each transparent substrate is substantially parallel to said rubbing direction and that of the other is perpendicular thereto.

11. A method of producing an active matrix type liquid crystal display device comprising two substrates arranged oppositely to each other via a liquid crystal layer, at least one substrate being transparent, in which a pixel electrode, a counter electrode, a counter voltage signal line, a scan signal line, a video signal line and an active element are provided in each pixel area on the one substrate side, and an electric field having a component substantially parallel to said at least one transparent substrate is generated by the voltage applied between the pixel electrode and the counter electrode in the liquid crystal layer, whereby the light transmitted through said liquid crystal layer is modulated, comprising the steps of:

arranging the counter electrode adjacent to said video signal line;

providing an insulating layer between said video signal line and said counter electrode adjacent to said video signal line; and arranging said video signal line and said counter electrode in superimposed relation over at least a major portion of said video signal line.

12. A method of producing an active matrix type liquid crystal display device as claimed in claim 11, further comprising the step of forming a light shielding layer by a printing method only in a direction substantially parallel to said scan signal line.

13. A method of producing an active matrix type liquid crystal display device as claimed in claim 12, wherein said light shielding layer and a layer colored with the three primary colors are fabricated by a printing method.

* * * * *